(12) United States Patent
Liu et al.

(10) Patent No.: US 6,528,970 B1
(45) Date of Patent: Mar. 4, 2003

(54) CHARGER CAPABLE OF CONVERTING MULTIPLE POWER SOURCES

(75) Inventors: Sen-Hsiang Liu, Taipei Hsien (TW); Yi-Te Chiang, Taipei (TW)

(73) Assignee: Primax Electronics Ltd., Taipei (TW)

( * ) Notice: Subject to any disclaimer, the term of this patent is extended or adjusted under 35 U.S.C. 154(b) by 0 days.

(21) Appl. No.: 10/064,457

(22) Filed: Jul. 17, 2002

(30) Foreign Application Priority Data

Nov. 29, 2001 (TW) ........................................ 90129557-A

(51) Int. Cl.⁷ .............................................. H01M 10/46
(52) U.S. Cl. ....................................................... 320/107
(58) Field of Search ................................ 320/107, 112, 320/113, 114, 115

(56) References Cited

U.S. PATENT DOCUMENTS 5,844,472 A * 12/1998 Lee
6,049,192 A * 4/2000 Kfoury et al.
2001/0000945 A1 * 5/2001 Watson et al.

* cited by examiner

*Primary Examiner*—Edward H. Tso
(74) *Attorney, Agent, or Firm*—Winston Hsu

(57) ABSTRACT

A charger includes a direct current (DC) converter and an alternating current (AC) converter. The DC converter includes a DC input port, a conversion circuit, a transmission port for inputting a second voltage, an output port, and a switch for selectively outputting the first voltage or the second voltage. The AC converter has an AC input port, an AC conversion circuit for transforming an AC power source to the second voltage, and a power port corresponding to the transmission port for outputting the second voltage to the transmission port. The DC converter and the AC converter are capable of engaging with each other such that the power port is connected to the transmission port, and the charger can provide power via the output port provided by the AC power source or the DC power source.

16 Claims, 13 Drawing Sheets

CHARGER CAPABLE OF CONVERTING MULTIPLE POWER SOURCES

BACKGROUND OF THE INVENTION

1. Field of the Invention

The invention relates to a charger, and more particularly, to a multifunctional charger capable of using multiple power sources.

2. Description of the Prior Art

The size and weight of many portable electronic devices have diminished with technological progress. To be portable, power-storage devices such as batteries are embedded in these portable devices to store and provide the needed power. Recharging of the battery is necessary to maintain a useable status.

Please refer to FIG. 1. FIG. 1 is a schematic diagram of a portable electronic device 10 charged using a charger 14A of prior art. The portable device 10 (a mobile phone, for example) comprises a charge port 12. The charger 14A comprises a corresponding output port 18A. The charger 14A further comprises an input port 16A used for inputting electric power from a power source such as the alternating current provided by a conventional domestic electrical outlet. To charge the portable device 10 using the charger 14A, connect the input port 16A of the charger 14A to a power source (the outlet, not shown) and connect the output port 18A to the charge port 12 of the portable device 10. The charger 14A is capable of converting the input power into the power type required by the portable device 10 (for example, an AC power source is converted into direct current) charging the portable device 10.

Various power sources for charging portable devices are becoming common. For instance, cars and airplanes are usually equipped with direct current sources of power enabling users to charge portable devices. Although the number of power sources is increasing, these sources are not necessarily compatible with the requirements of the portable devices. For this reason, portable devices can be charged safely and properly only through chargers.

However, a charger of prior art is designed for a specific source, and can only convert that specific kind of power into the type required by the portable devices. The design of the prior art charger limits users to single power source for charging portable devices resulting in inconvenience and inefficiency.

SUMMARY OF THE INVENTION

It is therefore a primary objective of the claimed invention to provide a charger capable of using multiple power sources to solve the above-mentioned problem.

The claimed invention discloses a charger comprising a direct current (DC) converter and an alternating current (AC) converter. The DC converter includes a DC input port for inputting a DC power source, a conversion circuit for converting the DC power source to a first voltage, a transmission port for inputting a second voltage, an output port for outputting a DC power, and a switch for selectively outputting the first voltage or the second voltage to the output port. The AC converter has an AC input port for inputting an AC power source, a conversion circuit for transforming the AC power source to the second voltage, and a power port corresponding to the transmission port of the DC converter for outputting the second voltage to the transmission port. The DC converter and the AC converter can engage with each other such that the power port is connected to the transmission port, and the charger can provide power via the AC power source or the DC power source.

It is therefore a primary objective of the claimed invention to provide a multifunctional charger, which is not only portable but also can use different kinds of power sources for charging portable devices, increasing convenience and efficiency.

DETAILED DESCRIPTION

Figure 1:
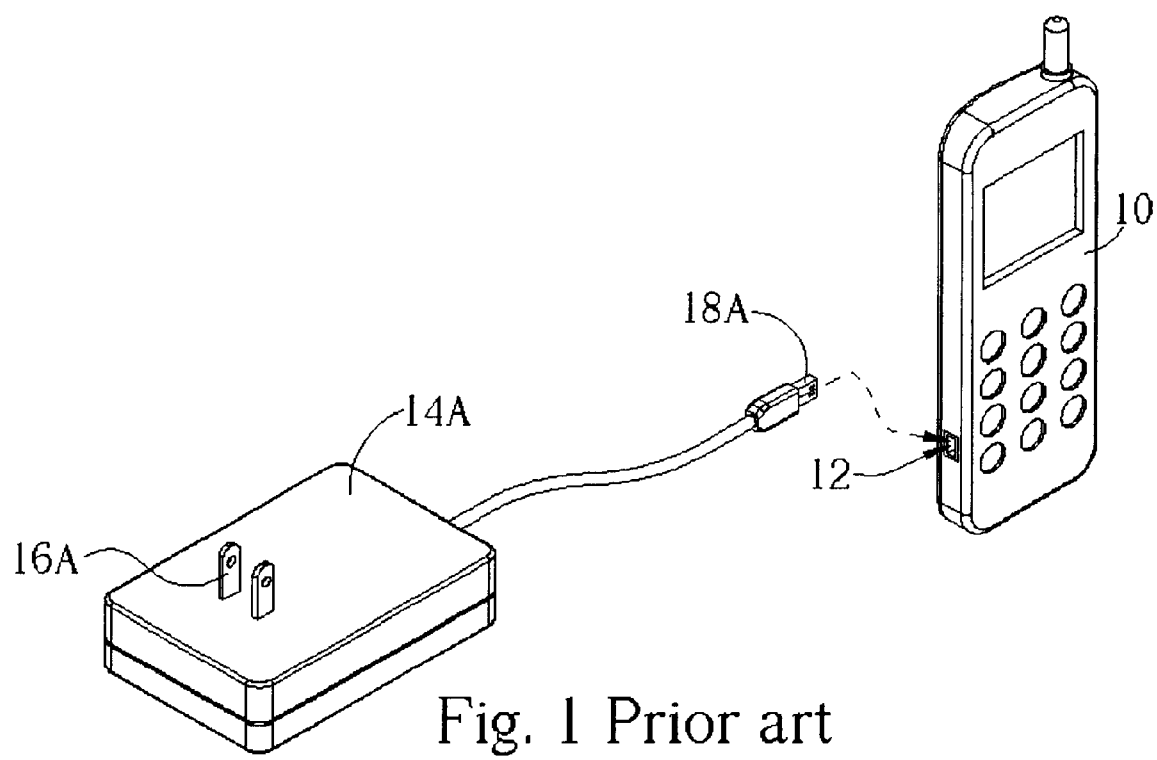
FIG. 1 is a schematic diagram of a portable device charged using a charger according to prior art.
Figure 2A:
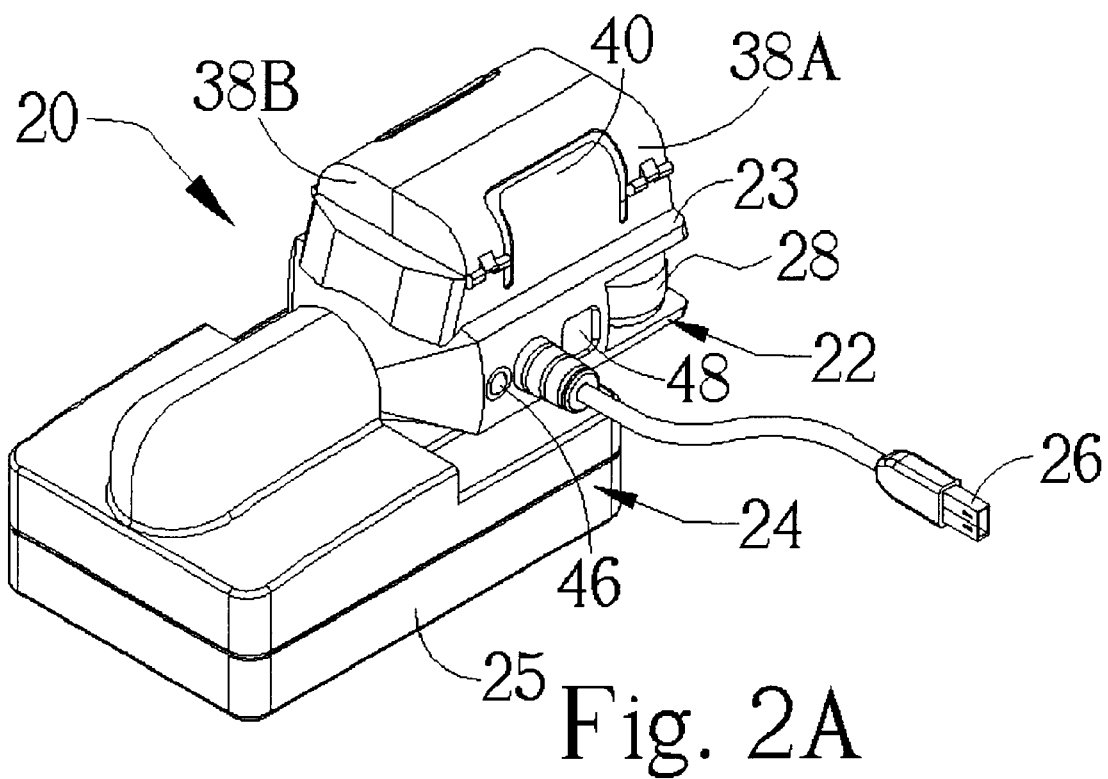
FIG. 2A to FIG. 2D are schematic diagrams illustrating a charger of the present invention from different angles.
Figure 2B:
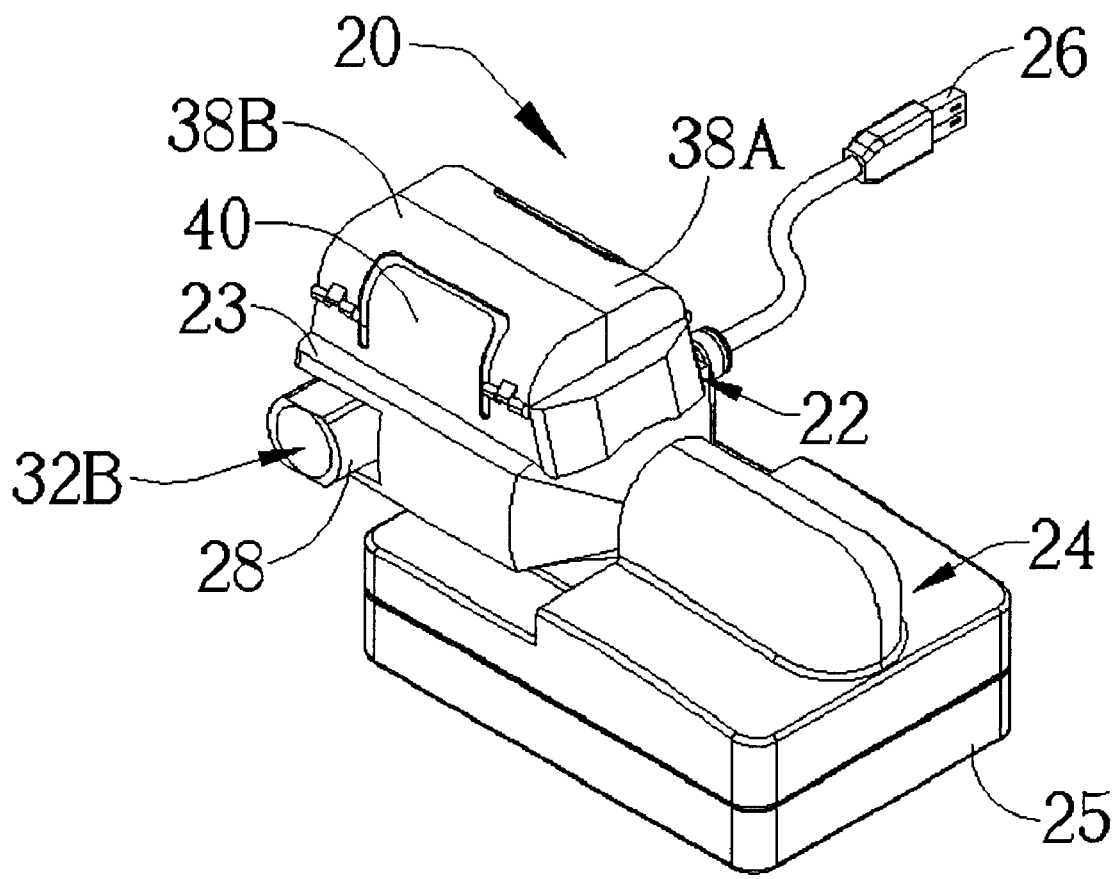
Figure 2C:
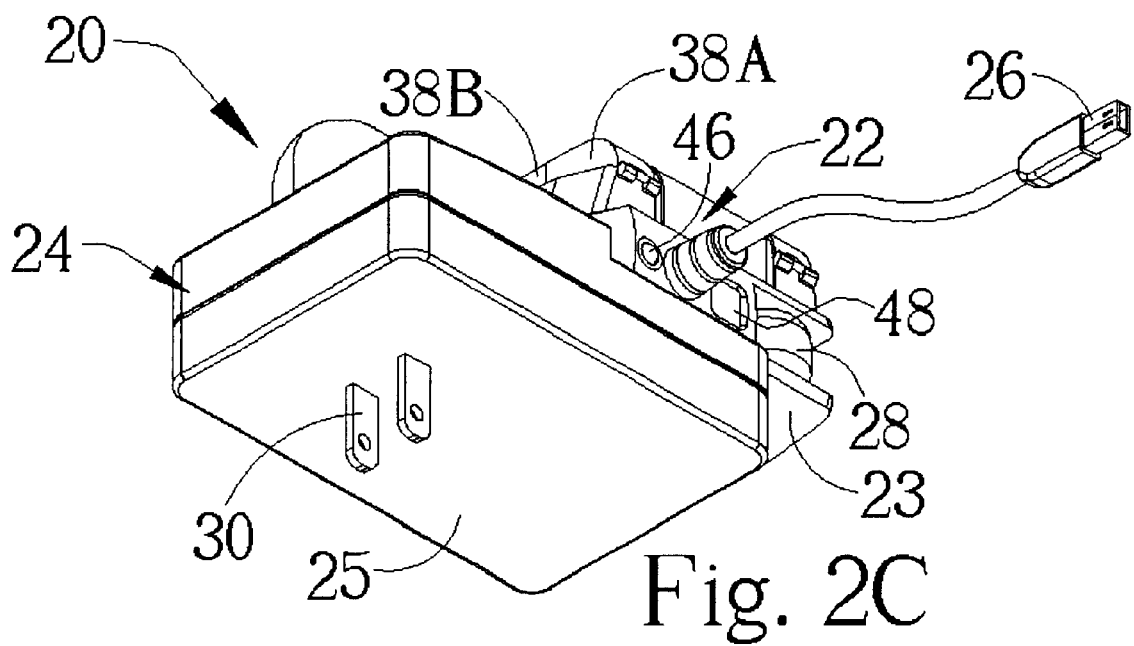
Figure 2D:
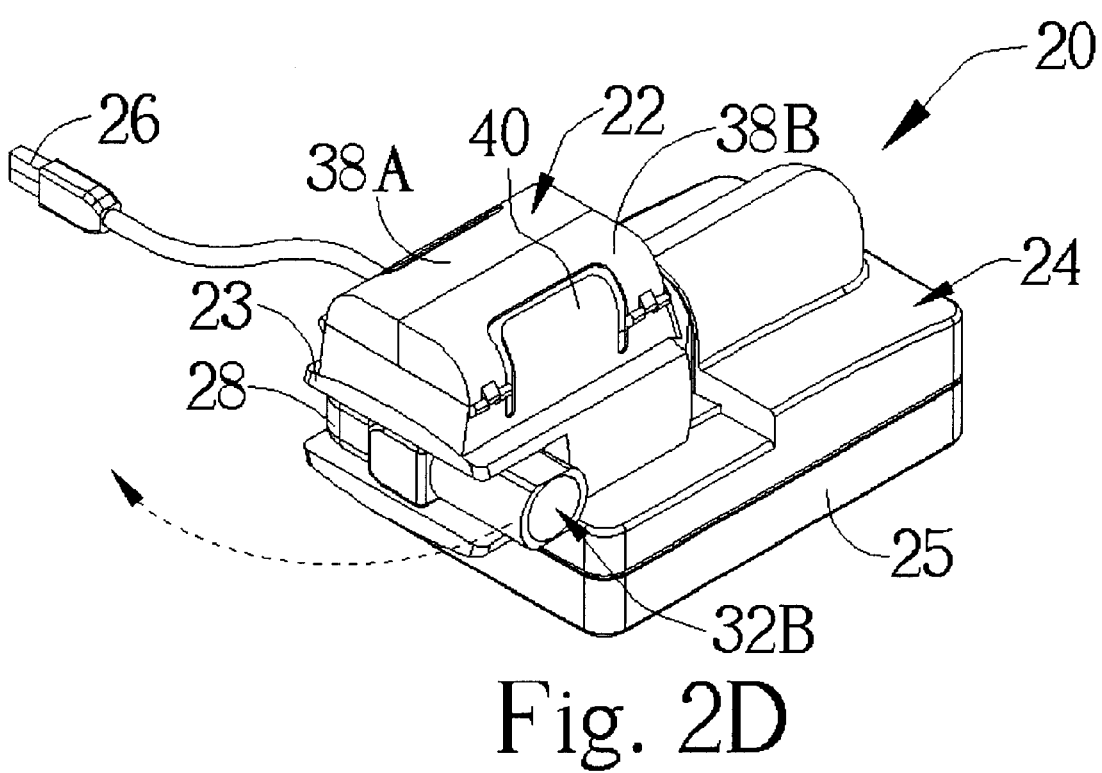
Figure 3A:
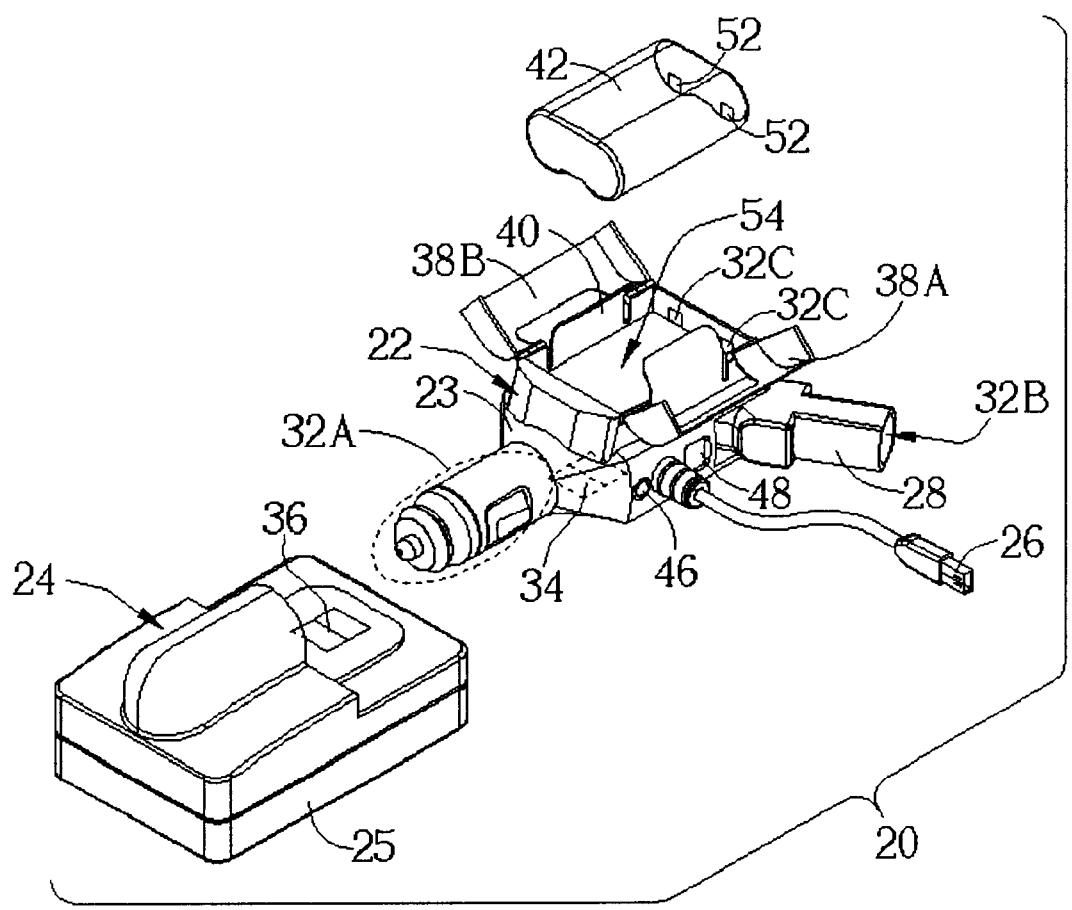
FIG. 3A and FIG. 3B are schematic diagrams illustrating the main components of the charger shown in FIG. 2A from different angles.
Figure 3B:
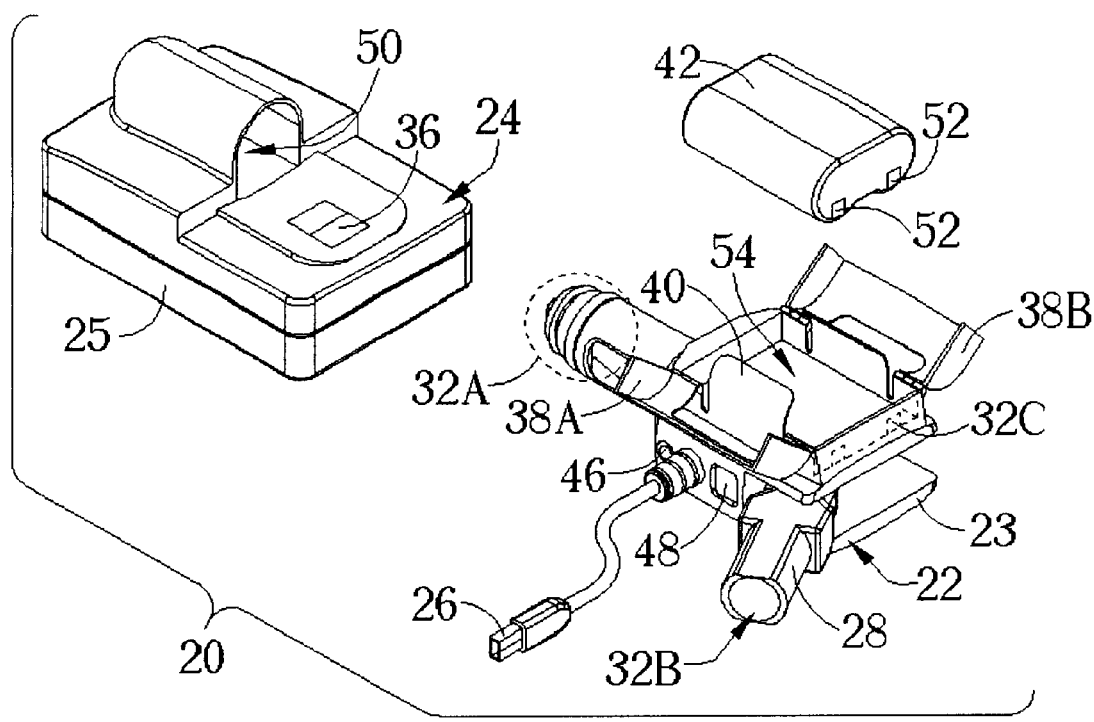

Please refer to FIG. 2A to FIG. 2D and FIGS. 3A and 3B. A charger 20 of the present invention comprises two portions, a direct current (DC) converter 22 and an alternating current (AC) converter 24. The AC converter 24 can be easily coupled to or uncoupled from the DC converter 22. FIG. 2A to FIG. 2D are schematic diagrams illustrating the DC converter 22 engaged with the AC converter 24 from different angles. FIG. 3A and FIG. 3B are schematic diagrams illustrating the DC converter 22 separated from the AC converter 24 from different angles. The DC converter 22 comprises a first housing 23 and three input ports 32A, 32B, and 32C (see FIGS. 3A and 3B). The three input port are designed for three different DC power sources, and each input port can receive one kind of DC power source.

The input port 32A corresponds to a car's electric output and can receive a DC power supplied by the car.

The input port 32B is positioned on a charge unit 28. The charge unit 28 is positioned inside the first housing in a stored or an outward extending state. In FIG. 2D, the charge unit 28 is stored inside the DC converter 22 and can be extended by rotation along the direction of the dotted lined arrowhead. FIGS. 3A and 3B illustrate an extended charge unit 28. The input port 32B is designed for an airplane's DC power source and can receive the DC electric power supplied by the airplane.

Additionally, a battery container 54 is positioned on the top of the DC converter 22 (see FIG. 3A and FIG. 3B) and is used for installing a battery 42. The battery 42 is used as a source of DC electric power and comprises an output terminal 52. The input port 32C, positioned inside the battery container 54, corresponds to the output terminal 52 and receives the DC electric power supplied by the battery 42. To hold the battery 42 in place, an elastic holdfast 40 is positioned on each side of the battery container 54. After installing the battery 42 in the battery container 54, the holdfast 40 fixes the position of the battery 42, maintaining the electrical connection between the output terminal 52 and the input port 32C. The battery container 54 further comprises two lids 38A and 38B, one on each side of the battery container 54, for covering the battery container 54. FIG. 2A to FIG. 2D illustrate the closed state of the lids 38A and 38B. FIG. 3A and FIG. 3B illustrate the lids 38A and 38B in the open state.

After inputting a different DC electric power respectively from an input port 32A, 32B, or 32C, the DC converter 22 transforms the input electric power into a first DC voltage, which is then outputted through an output port 26.

The other portion of the charger 20 of the present invention is the AC converter 24. The AC converter 24 comprises a second housing 25 as an outer covering and transforms the input electric power supplied by an AC power source into a second DC voltage. An input port 30 is positioned on the bottom of the AC converter 24 (see FIG. 2C) and is used for inputting the electric power supplied by the AC power source (for example, AC from domestic sockets). The top of the AC converter 24 is curved, forming a recess 50 that matches the shape of the input port 32A (see FIG. 3B). When coupling the AC converter 24 and the DC converter 22, the input port 32A of the first housing 23 is embedded in the recess 50 of the second housing 25 so that the AC converter 24 engages the DC converter 22 firmly, as shown in FIGS. 2A to 2D.

The AC converter 24 can transform the AC inputted from the input port 30 into the second DC voltage, which is outputted through a power port 36 of the second housing 25 (see FIG. 3A and FIG. 3B). Corresponding to the power port 36, a transmission port 34 is also positioned on the bottom of the DC converter 22 (see FIG. 3A). When the DC converter 22 and the AC converter 24 are coupled, the power port 36 is connected to the transmission port 34 so that the transmission port 34 is able to receive the second DC voltage outputted through the power port 36.

Figure 4:
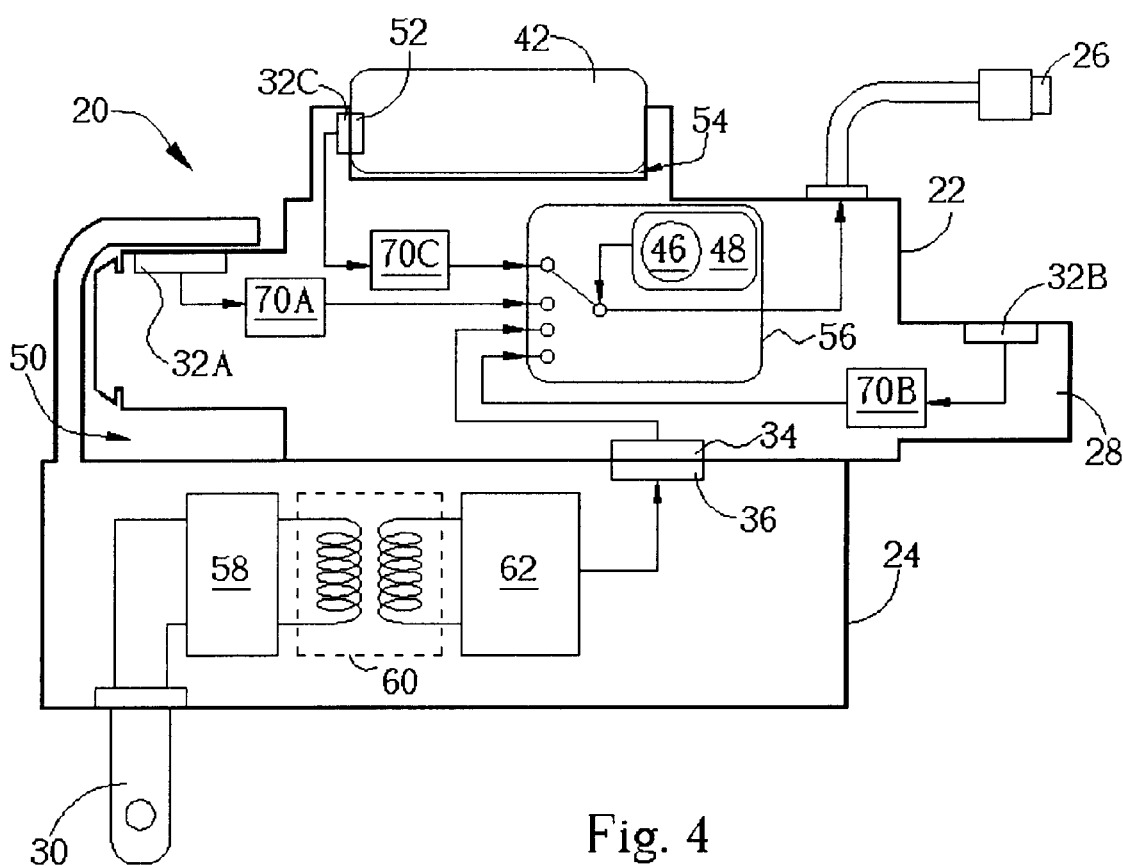
FIG. 4 is a functional block diagram of the charger shown in FIG. 2A.

Please refer to FIG. 4. FIG. 4 is a functional block diagram of a charger 20 of the present invention. A DC converter 22 comprises a switch 56 and each input port 32A to 32C has a corresponding conversion circuit 70A to 70C. Each conversion circuit 70A to 70C is used to transform the electric power inputted from each corresponding input port into a first DC voltage and transmit the altered electric power to the switch 56.

An input circuit 58 of matching impedance, a conversion circuit 60 used for regulating voltage, and a rectification circuit 62 used for transforming AC into DC are all positioned inside an AC converter 24. The AC inputted from an input port 30 is first fed to the input circuit 58 and then transmitted to a conversion circuit 60 for regulating voltage and current. The regulated AC exits the conversion circuit 60 and enters a rectification circuit 62 for transforming the AC into a second DC voltage, which outputs through a power port 36. When the AC converter 24 is coupled to the DC converter 22, the power port 36 is electrically connected to the transmission port 34 of the DC converter 22. The second DC voltage outputted through the power port 36 is transmitted to switch 56 via transmission port 34. In this embodiment, the second DC voltage is essentially equal to the first DC voltage.

As shown in FIG. 4, the charger 20 of the present invention is capable of inputting electric power from three different DC input ports 32A to 32C and from the AC input port 30. The inputted electric power is transformed into DC of a first or second voltage and then is transmitted to the switch 56 inside the DC converter 22. The switch 56 is used for selecting the first or second voltage to be outputted through the output port 26. For example, suppose a battery 42 and the AC power source simultaneously supply electric power from the input port 32C and the input port 30 respectively. The switch 56 can select the conversion circuit 70C to output the first DC voltage through the output port 26 or select the rectification circuit 62 to output the second DC voltage through the output port 26. A controller 46 controls the operation of the switch 56. The controller 46 may be an automatic controller (for example, the output port 26 is set to output which kind of electric power in a predetermined order) or a manual controller (for example, buttons positioned on the controller 46). Additionally, the switch 56 further comprises a display device 48 showing which source of electric power is being utilized. The display device 48 may be a small liquid crystal display (LCD) or a light-emitting diode (LED), as shown in FIGS. 2A, 2C, 3A, and 3B. Besides showing the selection of power source, the display device 48 can also show the charge remaining in the battery 42.

In another embodiment according to the present invention, the power port 36 of the AC converter 24 used for outputting the second DC voltage can be positioned inside the recess 50 of the second housing 25. When the DC converter 22 engages with the AC converter 24, the power port 36 positioned inside the recess 50 is able to directly connect with the input port 32A. Consequently, the second DC voltage from the AC converter 24 is fed to the conversion circuit 70A via input port 32A and then is transmitted to the switch 56, simplifying the needed circuitry to three input ports. Obviously, the second DC voltage would need to be regulated for compatibility with the designed purpose of the input port 32A.

Figure 5A:
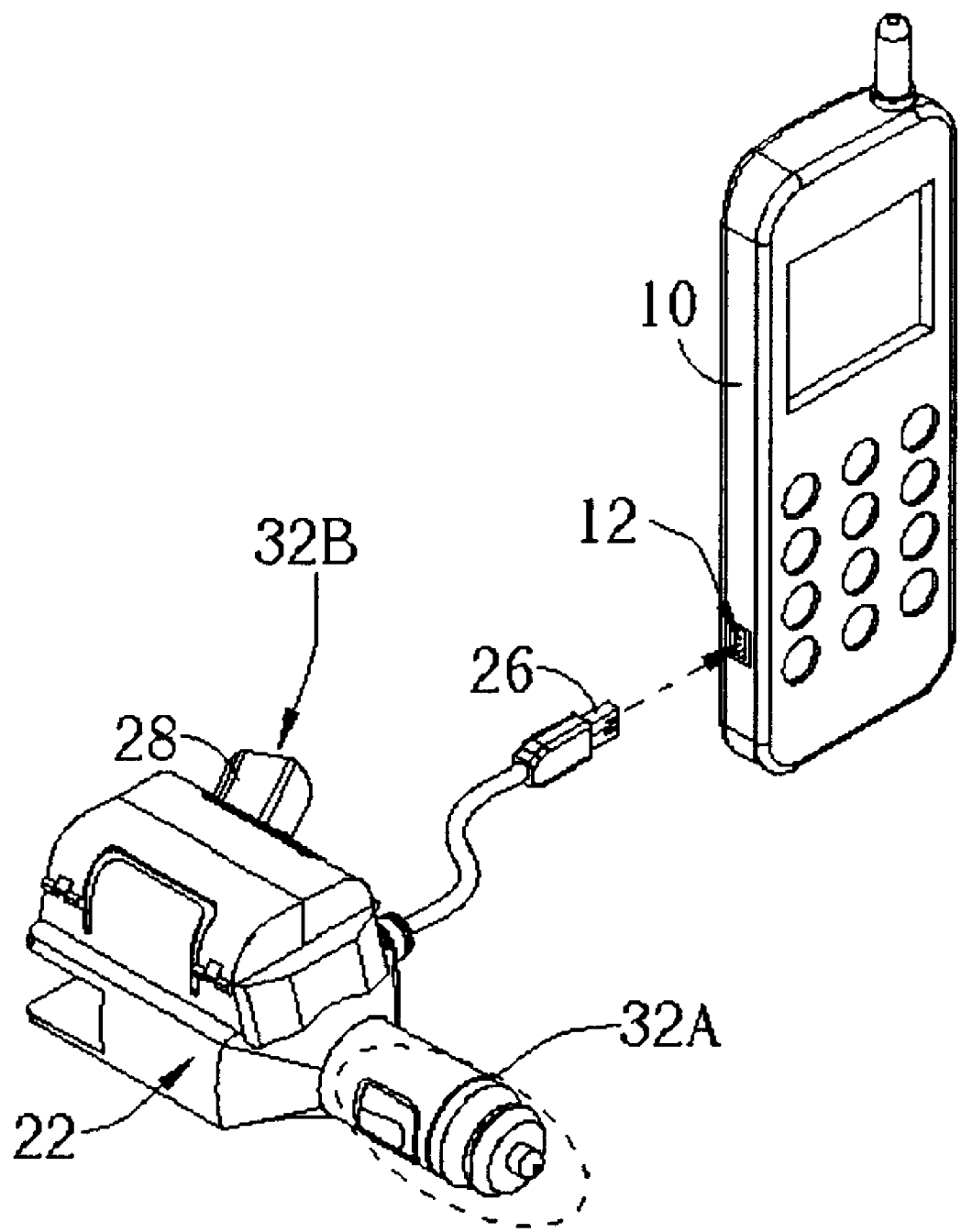
FIG. 5A and FIG. 5B are schematic diagrams of the charger shown in FIG. 2A using multiple power sources to charge a portable device.
Figure 5B:
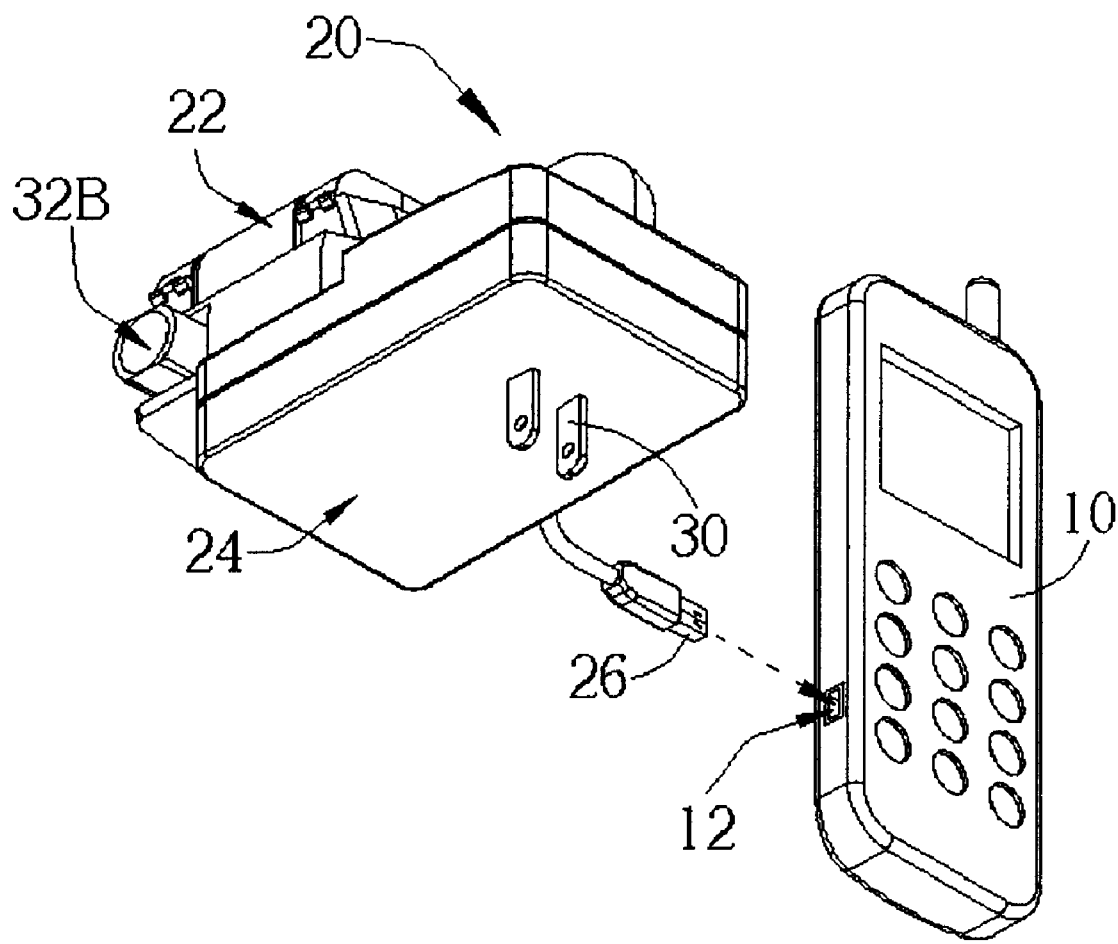

In brief, the charger 20 of the present invention comprises four different input ports designed to transform electric power supplied by four different kinds of power sources into power for charging an electric device, which is outputted through the output port 26. FIGS. 5A and 5B illustrate different dispositions of a charger 20 charging a portable device. FIG. 5A and FIG. 5B are schematic diagrams of the charger 20 using DC and AC power sources to charge a portable device 10, respectively. The portable device 10 may be a mobile phone, a PDA, or other portable electric device. As shown in FIG. 5A, when charging with a car's DC power source, separate a DC converter 22 from an AC converter 24 and connect an input port 32A to the DC power source in the car. An output port 26 of the DC converter 22 connects to a charge port 12 of the portable device 10 to charge the portable device 10. When using a DC power source in an airplane for charging, rotate a charge unit 28 to an extended position and connect an input port 32B with a socket (not shown) in the airplane. Electric power is outputted through output port 26 for charging the portable device 10. Each conversion circuit corresponding to each input port is able to transform the inputted DC into a first voltage; that required by the portable device 10. By controlling the switch (see FIG. 4), the DC converter 22 can charge portable devices using different power sources, such as power sources in a car, in an airplane, or in batteries.

Additionally, as shown in FIG. 5B, to use an AC source (such as AC power sources supplied by domestic sockets) for charging the portable device 10, assemble the DC converter 22 with the AC converter 24. Connect an input port 30, positioned on the bottom of the AC converter 24, with the socket supplying the AC power source and connect the output port 26 to the charge port 12 of the portable device 10. Consequently, the AC converter 24 transforms the AC power source into a second DC voltage, which transmits to the switch 56 via the power port 36 and the transmission port 34 (see FIG. 4), and finally outputted through output port 26 for charging the portable device 10. The second DC voltage is the normal electric power required by the portable device 10. By controlling the switch 56, the DC converter 22 can use electric power supplied by the battery 42 (FIG. 3A) to charge the portable device 10 in either disposition shown in FIGS. 5A and 5B.

Figure 6A:
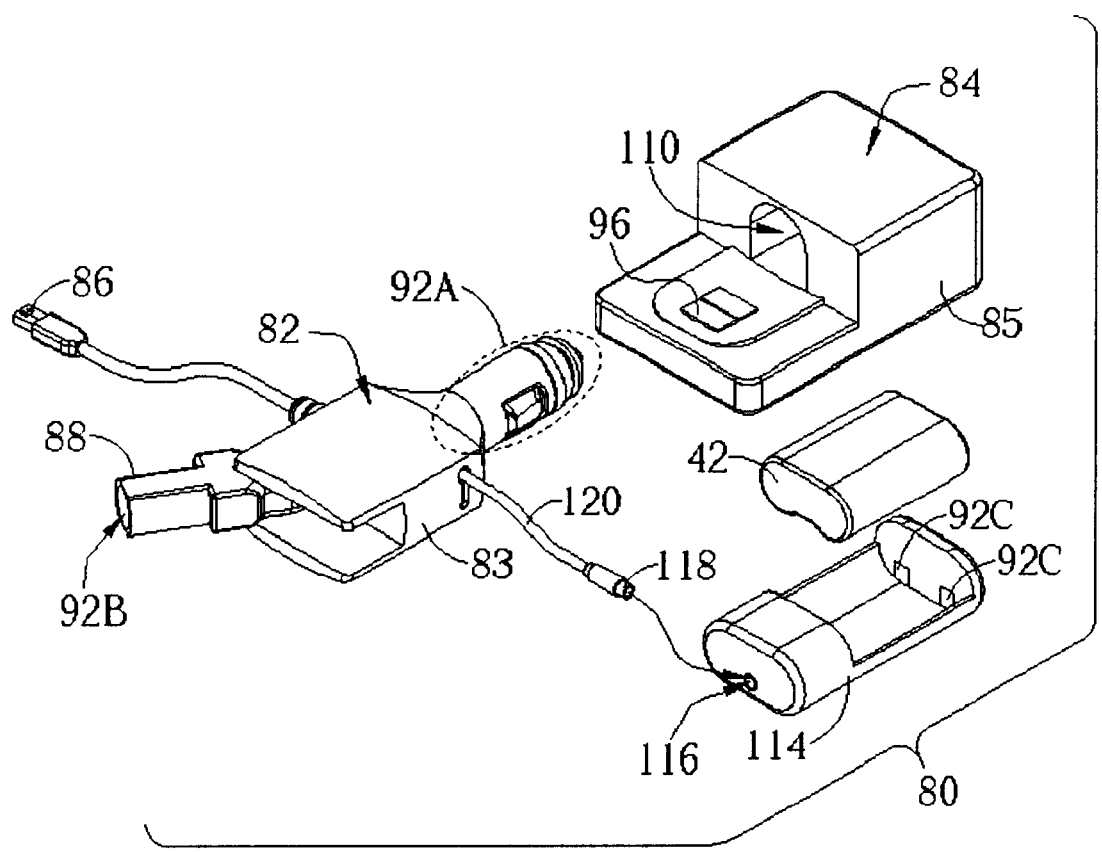
FIG. 6A to FIG. 6C are schematic diagrams illustrating another charger according to the present invention from different angles and in different states.
Figure 6B:
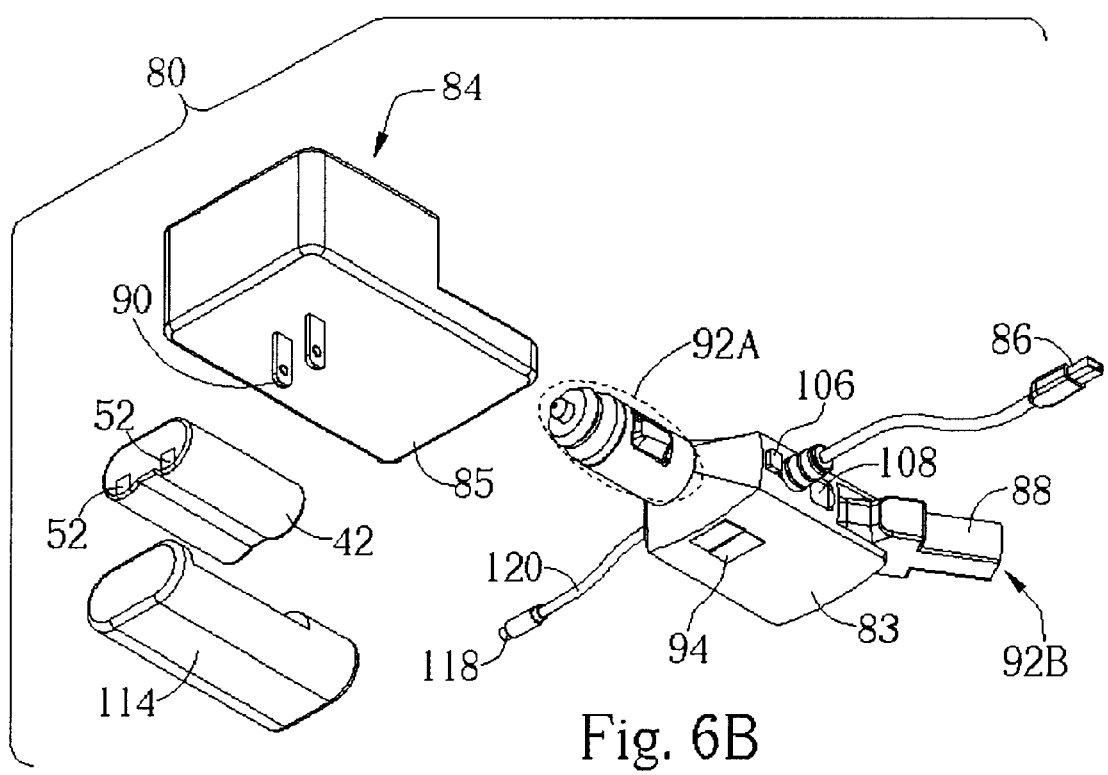
Figure 6C:
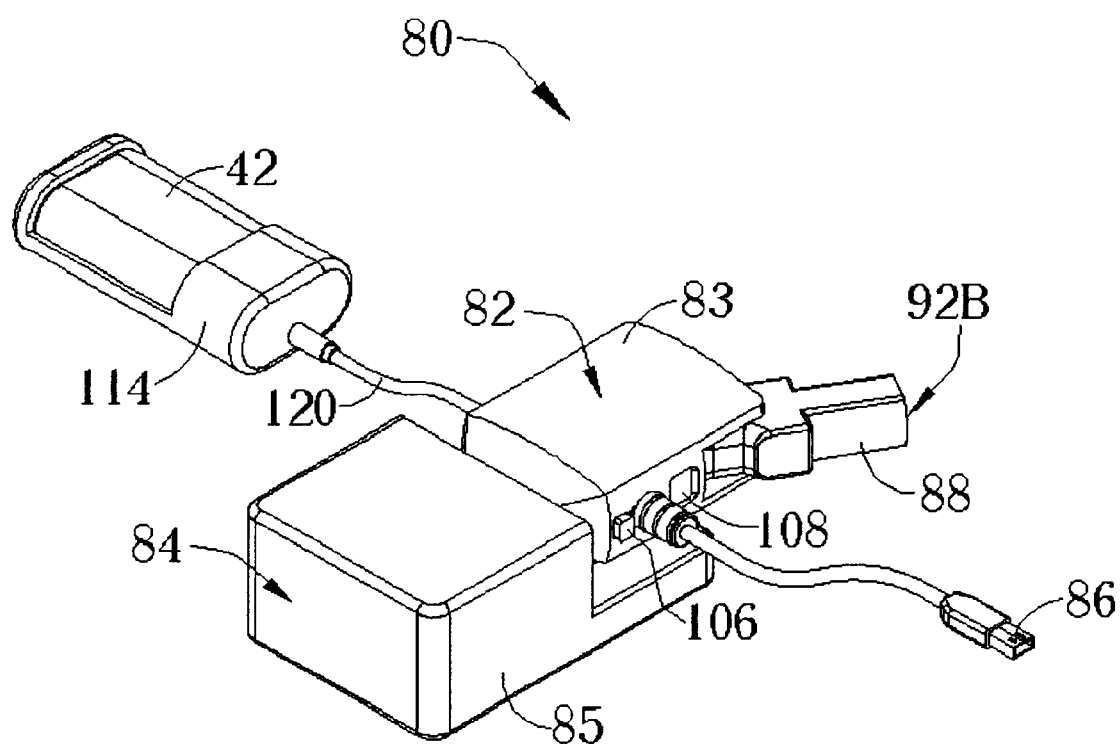

Please refer to FIG. 6A to FIG. 6C. FIG. 6A to FIG. 6C are schematic diagrams illustrating another embodiment of a charger 80 of the present invention from different angles. Similar to the former embodiments, the charger 80 also comprises two portions, a DC converter 82 and an AC converter 84. FIG. 6A and FIG. 6B illustrate the DC converter 82 separated from the AC converter 84. FIG. 6C illustrates the DC converter 82 engaged with the AC converter 84. The function of the DC converter 82 is the same as the DC converter 22 of the former embodiments. The DC converter 82 is surrounded by a first housing 83 and comprises three input ports 92A, 92B, and 92C.

The functions of these three input ports 92A, 92B, and 92C are also the same as the input ports 32A, 32B and 32C of the former embodiment. A charge unit 88 is capable of extending or being stored inside the DC converter 82 by rotation. The input port 92C, positioned on a battery container 114, can input DC electric power from a battery 42 from an output port 52 (see FIGS. 6A and 6B).

The function of the AC converter 84 is the same as the AC converter 24 of the former embodiment. The AC converter 84 is surrounded by a second housing 85 and comprises an input port 90 (see FIG. 6B). A recess 110 of the second housing 85 is able to contain the input port 92A of the first housing 83 to engage the DC converter 82 with the AC converter 84 as shown in FIG. 6C. The functions of a transmission port 94 of the DC converter 82 (see FIG. 6A) and a corresponding power port 96 of the AC converter 84 are the same as the transmission port 34 and the power port 36 of the former embodiment. The transmission port 94 and the power port 96 connect when the DC converter 82 engages with the AC converter 84. The main difference between the charger 80 and the charger 20 of the former embodiment is that the battery container 114 of the charger 80 is designed as a separate unit. The DC converter 82 detachably connects with an output port 116 of the battery container 114 via a connection port 118 of a transmission line 120. FIG. 6A and FIG. 6B illustrate the battery container 114 separated from the DC converter 82. FIG. 6C illustrates the battery container 114 connected to the DC converter 82 by the transmission line 120. When using the battery 42 as a power source, connect the battery container 114 to the DC converter 82 using the transmission line 120. When the battery 42 is not needed, the battery container 114 may be removed from the DC converter 82. In a preferred embodiment, the transmission line 120 can be folded inside the first housing 83 for easy storage.

The operating principles of the charger 80 are the same as the charger 20 of the former embodiment. The electric power inputted from the input ports 92A, 92B, and 92C (via the transmission line 120 and the connection port 118), transmits to the DC converter 82, and is transformed into the first DC voltage by corresponding conversion circuits. A second DC voltage inputted from the input port 90 and generated after transformation and rectification, transmits to the DC converter 82 via the transmission port 94 and the power port 96. Using a controller 106 (see FIG. 6B and FIG. 6C), the switch of the DC converter 82 can select different electric power sources, which are all outputted through the output port 86. In this way, users can exploit different kinds of power sources to charge portable devices via the output port 86. Users can check the current power source using a display device 108.

The functional block diagram of the charger 80 is the same as the charger 20 of the former embodiment, as shown in FIG. 4. The conversion circuit corresponding to the input port 92C can be positioned inside the battery container 114, so the first DC voltage generated by the conversion circuit can be transmitted to the switch of the DC converter 82 via the output port 116, the transmission line 120 and the connection port 118. Equally as well, the conversion circuit corresponding to the input port 92C also can be positioned inside the DC converter 82, so the electric power supplied by the battery is first inputted from connection port 118 and then is transformed into the first DC voltage.

In contrast to the prior art charger that can only use a single power source to charge portable devices, the charger of the present invention can use four different power sources including DC or AC for charging. The multi-functional charger is not only portable but also can use different kinds of power sources for charging portable devices anywhere, increasing convenience and efficiency.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A charger comprising:
   a direct current (DC) converter comprising:
   a first housing;
   a first input port positioned on the first housing for receiving an input voltage carried by direct current;
   a first conversion circuit positioned inside the first housing for transforming the input voltage into a first voltage carried by direct current;
   a transmission port positioned on the first housing for receiving a second voltage carried by direct current;
   an output port positioned on the first housing for outputting one voltage of either the first voltage or the second voltage; and
   a switch connected to the first conversion circuit, the transmission port, and the output port for switching to the first conversion circuit to output the first voltage through the output port or switching to the transmission port to output the second voltage through the output port; and
   an alternating current (AC) converter comprising:
   a second housing;
   a second input port positioned on the second housing for receiving an input voltage carried by alternating current;
   a second conversion circuit positioned inside the second housing for transforming the input voltage into the second voltage; and
   a power port, which corresponds to the transmission port of the direct current converter, positioned on the second housing for outputting the second voltage to the transmission port;
   wherein the first housing and the second housing are capable of engaging with each other so that the power port is connected to the transmission port, and the charger is capable of changing an output voltage of the output port according to operation of the switch.

2. The charger of claim 1 wherein the input voltage received by the first input port is outputted from a power supply in a car.

3. The charger of claim 1 wherein the input voltage received by the first input port is outputted from a battery.

4. The charger of claim 1 wherein the input voltage received by the first input port is outputted from a power supply on an airplane.

5. The charger of claim 1 wherein the second housing further comprises a cavity for receiving the first housing to make the first housing engage with the second housing.

6. The charger of claim 1 wherein the switch further comprises a controller for controlling the switch to pass the first voltage or the second voltage to the output port.

7. The charger of claim 1 wherein the switch further comprises a display device for showing which of the first voltage and the second voltage is passed by the switch to the output port.

8. The charger of claim 1 wherein the first voltage is equal to the second voltage.

9. A charger comprising:
   a direct current (DC) converter comprising:
      a first housing;
      a plurality of first input ports positioned on the first housing for receiving a plurality of input voltages carried by direct current;
      a plurality of first conversion circuits positioned inside the first housing, each first conversion circuit being connected to one of the first input ports for transforming the received input voltage into a corresponding first voltage carried by direct current;
      a transmission port positioned on the first housing for receiving a second voltage carried by direct current;
      an output port positioned on the first housing for outputting one voltage among the first voltages and the second voltage; and
      a switch connected to the first conversion circuits, the transmission port, and the output port for determining which of the first voltages and the second voltage is passed by the switch to the output port; and
   an alternating current (AC) converter comprising:
      a second housing;
      a second input port positioned on the second housing for receiving an input voltage carried by alternating current;
      a second conversion circuit positioned inside the second housing for transforming the input voltage into the second voltage; and
      a power port, which corresponds to the transmission port of the direct current converter, positioned on the second housing for outputting the second voltage to the transmission port;
   wherein the first housing and the second housing are capable of engaging with each other so that the power port is connected to the transmission port, and the charger is capable of changing an output voltage of the output port according to operation of the switch.

10. The charger of claim 9 wherein one of the input voltages received by the first input port is outputted from a power supply in a car.

11. The charger of claim 9 wherein one of the input voltages received by the first input port is outputted from a battery.

12. The charger of claim 9 wherein one of the input voltages received by the first input port is outputted from a power supply on an airplane.

13. The charger of claim 9 wherein the second housing further comprises a cavity for inserting the first housing to make the first housing engage with the second housing.

14. The charger of claim 9 wherein the switch further comprises a controller for controlling the switch to pass the first voltage or the second voltage to the output port.

15. The charger of claim 9 wherein the switch further comprises a display device for showing which of the first voltage and the second voltage is passed by the switch to the output port.

16. The charger of claim 9 wherein the first voltage is equal to the second voltage.

* * * * *